US007159104B2

(12) United States Patent
Dewey

(10) Patent No.: US 7,159,104 B2
(45) Date of Patent: Jan. 2, 2007

(54) SIMPLIFIED MEMORY DETECTION

(75) Inventor: Thomas E. Dewey, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 435 days.

(21) Appl. No.: 10/442,550

(22) Filed: May 20, 2003

(65) Prior Publication Data

US 2004/0236933 A1 Nov. 25, 2004

(51) Int. Cl.
*G00F 15/177* (2006.01)
*G06F 7/00* (2006.01)

(52) U.S. Cl. .................. 713/1; 713/2; 360/55; 360/69; 360/71

(58) Field of Classification Search .................... 713/1, 713/2; 331/174, 135, 49; 360/55, 69, 71
See application file for complete search history.

(56) References Cited

U.S. PATENT DOCUMENTS 4,638,178 A * 1/1987 Kayser ........................ 307/85
5,293,498 A * 3/1994 Iwatsubo .................... 710/104
5,986,842 A * 11/1999 Matsumoto et al. .......... 360/69
6,400,043 B1 * 6/2002 Batson et al. ................. 307/66
6,434,632 B1 * 8/2002 Hall ............................ 710/14
6,900,701 B1 * 5/2005 Chan ........................... 331/74
2003/0222503 A1 * 12/2003 Lam et al. .................... 307/38

* cited by examiner

*Primary Examiner*—A. Elamin
(74) *Attorney, Agent, or Firm*—Patterson & Sheridan, L.L.P.

(57) ABSTRACT

Automatic recognition of the type of memory within a device package by using strap resistors within the device package. Such recognition enables a processor, such as a GPU, to automatically configure itself to work with the memory. A device package includes a strap contact and a bit input that are electrically connected. The device package beneficially contains a processor (such a GPU) that is operatively connected to the bit input, and a memory device that is operatively connected to the processor. By selectively inserting a strap resistor the voltage applied to the bit input changes state. That state can be read and used to set up the system.

19 Claims, 4 Drawing Sheets

SIMPLIFIED MEMORY DETECTION

BACKGROUND OF THE INVENTION

Field of the Invention

The present invention relates to electronic system integration. More particularly, this invention relates to integrating electronic devices and printed circuit boards such that features are automatically detected.

Digital computers are used to perform a wide variety of tasks in business, industry, government, education, entertainment, and the home. Modern computers often incorporate powerful, dedicated digital processors that implement complex functions such as 3-D graphics, voice recognition, and the like. The performance of such applications directly benefit from more powerful, more capable dedicated digital processors. Each new generation of dedicated digital processor seems to increase performance at reduced cost.

Because of the wide range of uses and applications, together with various cost constraints imposed by different users, computer manufacturers have had to produce computers with different capabilities to satisfy different market segments. This has often required multiple configurations of computer microprocessors, dedicated digital processors, memory, motherboards, input/output functions, and display devices. For example, higher end systems can include multiple processors, graphics accelerators, media processor chips, high-speed input output chips, and the like. In particular, it should be noted that different configurations can have widely different memory (such as RAM) requirements.

As computer systems have developed, improved central processing units (CPU) and improved graphics processing units (GPU) have become keys to increasing their power and capability. Therefore, device manufacturers have expended a great deal of research and development efforts improving the capabilities of CPU and GPU devices. Those efforts have caused the designs and features of CPU and GPU devices to rapidly evolve.

Because of competitive pressure, even as computer systems have become more powerful their manufacturers are pressured to reduce costs. One method of reducing costs is to reduce the number of different types of devices required to support the CPU and the GPU devices. Because of that, modern computer chipsets that support multiple CPU and GPU models have evolved. Such chipsets integrate the functions previously performed by a large number of integrated circuits into a small number of chip components, thereby reducing manufacturing costs and saving space. Another approach to reducing costs is the use of industry standard interfaces. Such interfaces not only enable mass production, they enable the evolution of external devices that are backwards compatible with prior computer systems.

While new chip sets and industry standard interfaces are highly advantageous, unfortunately they may have to be redesigned to support changes to the CPU and to the GPU. For example, even a minor change to a socket interface of a CPU or a GPU can require major, costly changes to chipsets and to industry standard interfaces. Thus, there is pressure to limit changes to a processor's interface as successive models are introduced. Because of this, changes to CPU and GPU interfaces are infrequent, maybe once every two or three years, even though the internal architecture of a processor line may be updated many times within that time frame.

Limiting changes to a processor's interface results in a number of problems. One such problem relates to the fact that limiting socket interface changes can impede the evolution and improvement of processor models. New technology that requires an interface change may be held back until it becomes cost effective to bring out the new interface. For example, even though significant advances could be made in a processor's internal architecture, or even though clock speeds could be significantly increased, it may not be either cost effective or possible to introduce those changes in devices that use the existing socket interface. Additionally, new socket interfaces have the undesirable effect of making previous socket interfaces obsolete (e.g., "Slot 1", "Socket 7", "Socket 8", etc. from Intel™ and the other CPU manufactures).

Even though the socket interface of a CPU or GPU is seldom changed, internal features of available CPUs and GPUs change frequently and/or a particular CPU or GPU product line may be designed with different features. For example, a given CPU or GPU may have both a low power/low speed mode, such as for portable computers, and a high power/high speed mode for desktop computers. Furthermore, to reduce the number of different versions of CPUs or GPUs, a particular processor may be designed to operate at different supply voltages such as 3.3V or 5V.

In any event, a CPU or GPU processor usually must interface with random access memory (RAM). RAM is available in a variety of different types, including asynchronous static RAM, synchronous static RAM, pipeline burst static RAM, fast page mode dynamic RAM, extended data out dynamic RAM, RAMbus dynamic RAM, double data rate dynamic RAM, synchronous dynamic RAM, and the like. In addition to the different types of RAM, the different types of RAM are available in different operating speeds. Furthermore the different types of RAM are available in different capacities, conventionally measured in megabytes. Thus, the optimum RAM to use in a particular application will depend on factors such as cost, availability, and desired performance.

While RAM typically has been located on a motherboard, a new semiconductor device package, the mobile application package (MAP) used by NVIDIA, the assignee of the present invention, can package RAM and a GPU together. Because of the different cost, speed, and performance options available with RAM, this is beneficial because it enables different MAP packaged processor-RAM combinations to be offered to higher-level system manufacturers. That enables higher-level system manufacturers to offer systems with different cost, speed, and performance options using the same motherboard, but without the logistical problems of configuring that motherboard for different GPU and RAM types. Additionally, MAP-packaged processor-RAM combinations benefit the manufacturer by allowing for competitive pricing and backup suppliers.

When RAM is located on a motherboard, different RAM-processor combinations can be implemented using "straps" that selectively connect pins of a device, such as a graphic processing unit (GPU) to different voltages, typically ground and supply. The different voltages are produced by populating the motherboard with resistors (specifically including zero-ohm jumpers) that selectively connect the straps to either ground or to the power supply. For example, FIG. 1 illustrates a strap system 10. As shown, an input 11 of a GPU 12 is connected either to a power supply voltage 13 through a resistor 14, orto ground 15 via a resistor 16, by a strap 18. All of those features are incorporated on a motherboard 20. As shown, an input 11 of a GPU 12 is connected by a strap 18 to ground 15 via a resistor 16. All of those features are incorporated on a motherboard 20.

Still referring to FIG. 1, the actual voltage that is applied to the input 11 is determined by selectively populating the motherboard 20 with either the resistor 14 or with the resistor 16. By having multiple inputs 11, a multi-bit digital code can be applied to the GPU 12. During a system reset, that digital code can be read into and stored within the GPU 12. Operating software can subsequently read the bit pattern to determine what type of memory (RAM) is being used so that the proper initialization sequence and programming of the memory interface can be performed. So, by properly populating the motherboard the GPU is informed as to what RAM is being used. But, the logistical problem of configuring the motherboard for the different GPU and RAM types remains.

While the strap system illustrated in FIG. 1 is generally successful, the high-level of integration on a MAP packaged processor-RAM combination presents a unique problem since there is very little room to locate the required strap resistors (including zero-ohm resistors) in or on the package. Additionally, if strap resistors were used great care would have to be taken to ensure that the electrical performances of the signal nets to which they are connected are not impaired. However, since the MAP contains the RAM, the MAP is the appropriate place to locate the strap resistors.

Therefore, a new method of integrating a processor with RAM would be beneficial. Also beneficial would be a new device package that enables the presence or absence of a strap resistor to signal what type of RAM is within the device package. Beneficially, the device package includes RAM, and the presence or absence of the resistor controls a bit that signal the RAM type. Preferably, the device package enables a plurality of bits to be controlled, with the state of each bit depending on the presence or absence of an associated resistor. A digital system that performs system initialization based on a device package that enables a plurality of bits to be controlled, with the state of each bit depending on the presence or absence of an associated resistor would be useful.

SUMMARY OF THE INVENTION

Embodiments of the present invention enable automatic recognition of the type of memory within a device package via a resistance, referred to hereinafter as a strap resistance, within the device package itself. This enables a processor, such as a GPU, to automatically configure itself to work with the memory being used. Ideally, the automatic configuration is such that a variety or sources of memory (RAM) can be used without burdening the assembler with the logistical problem of configuring the GPU and memory together and such that multiple sources of memory can be used to enable competitive pricing and backup sources in case of supply problems.

Furthermore, the principles of the present invention enable a device package having a standardized interface that mates with a printed circuit board such that different GPU versions and memory types can be contained within the device package itself and without requiring changes to the printed circuit board.

A system that is in accord with the principles of the present invention includes a device package having a strap contact and a bit input that are connected together by a circuit element (beneficially a strap resistor, which may take the form of a zero-ohm jumper). The device package contains a processor (such a GPU) that is operatively connected to the bit input and a memory device that is operatively connected to the processor. When a strap resistor is connected to the strap contact a first voltage is applied to the bit input, when a strap resistor is not connected to the strap contact a second voltage is applied to the bit input. The first voltage controls the processor in a first manner and the second voltage controls the processor in a second manner.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Reference will now be made in detail to a preferred embodiment of the present invention, examples of which are illustrated in the accompanying drawings. While the invention will be described in conjunction with the preferred embodiment, it will be understood that the preferred embodiment is not intended to limit the invention. On the contrary, the invention is intended to cover alternatives, modifications and equivalents, which may be included within the spirit and scope of the invention as defined by the appended claims. Furthermore, in the following detailed description, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

The principles of the present invention enable automatic recognition of the type of memory within a device package via a strap resistor within the device package itself. This enables a processor, such as a GPU, to automatically configure itself to work with the memory being used. Ideally, the automatic configuration is such that a variety of sources of memory (RAM) can be used without burdening the assembler with the logistical problem of configuring the GPU and memory together and such that multiple sources of memory can be used to enable competitive pricing and backup sources in case of supply problems. The device package beneficially provides an interface that can accommodate changes in the I/O architecture (electrical signal pins) of a GPU while maintaining a standardized interface for coupling to a PCB. Additionally, embodiments of the present invention can accommodate different GPU versions supporting different feature sets while maintaining a standardized PCB interface.

Figure 1:
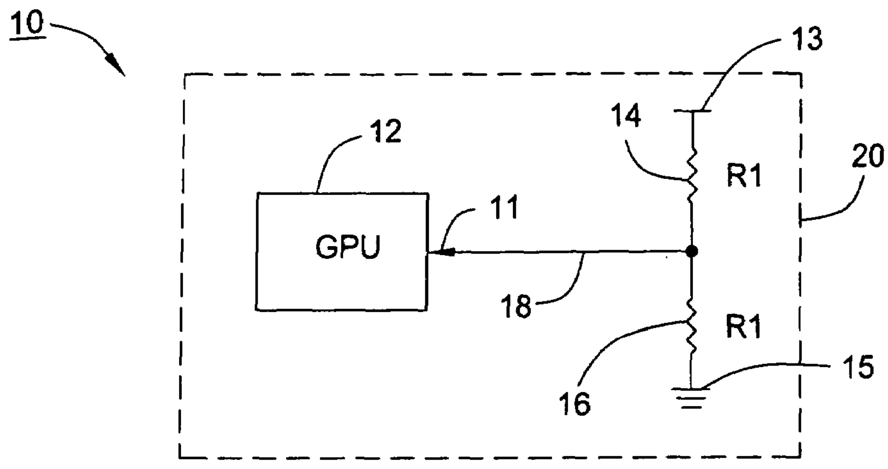
FIG. 1 shows a strap system that controls the voltage at a pin.
Figure 2A:
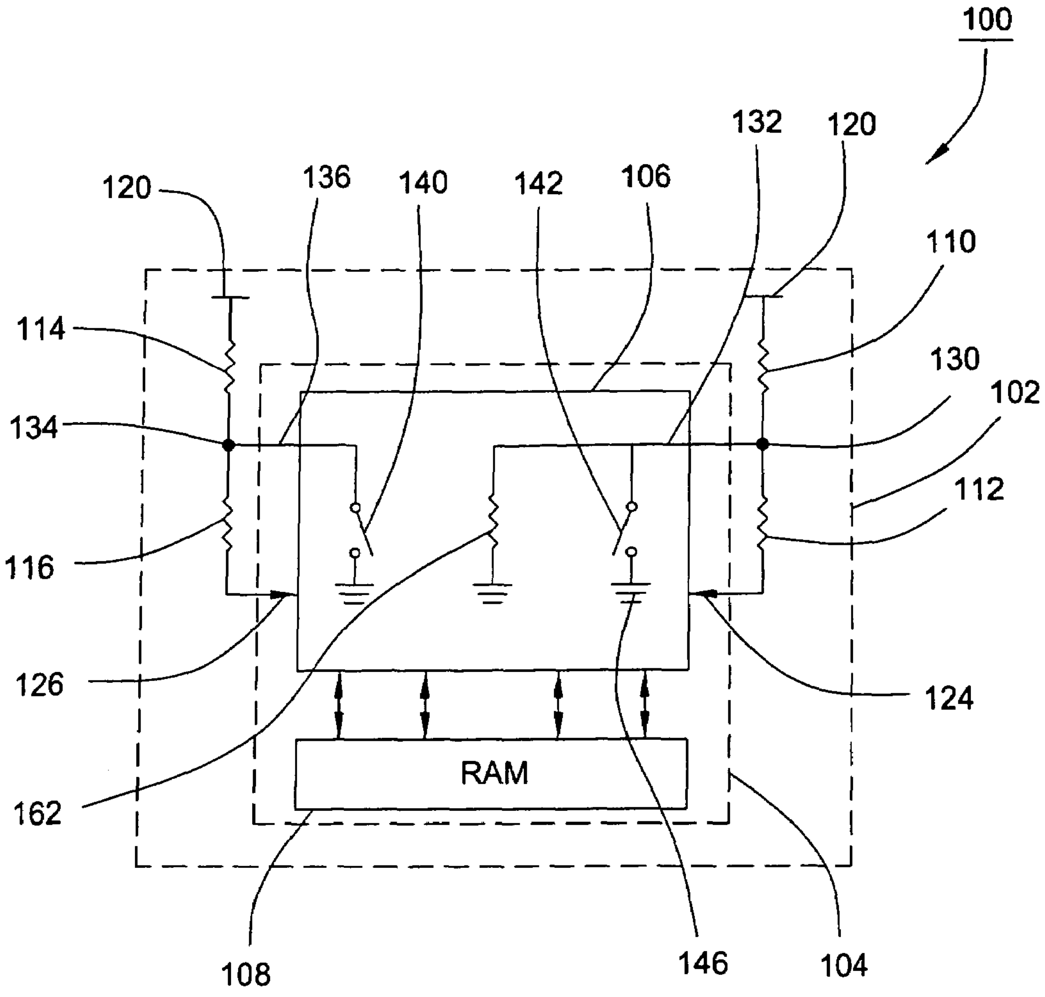
FIGS. 2A and 2B illustrate a strap system that is in accord with the principles of the present invention.
Figure 2B:
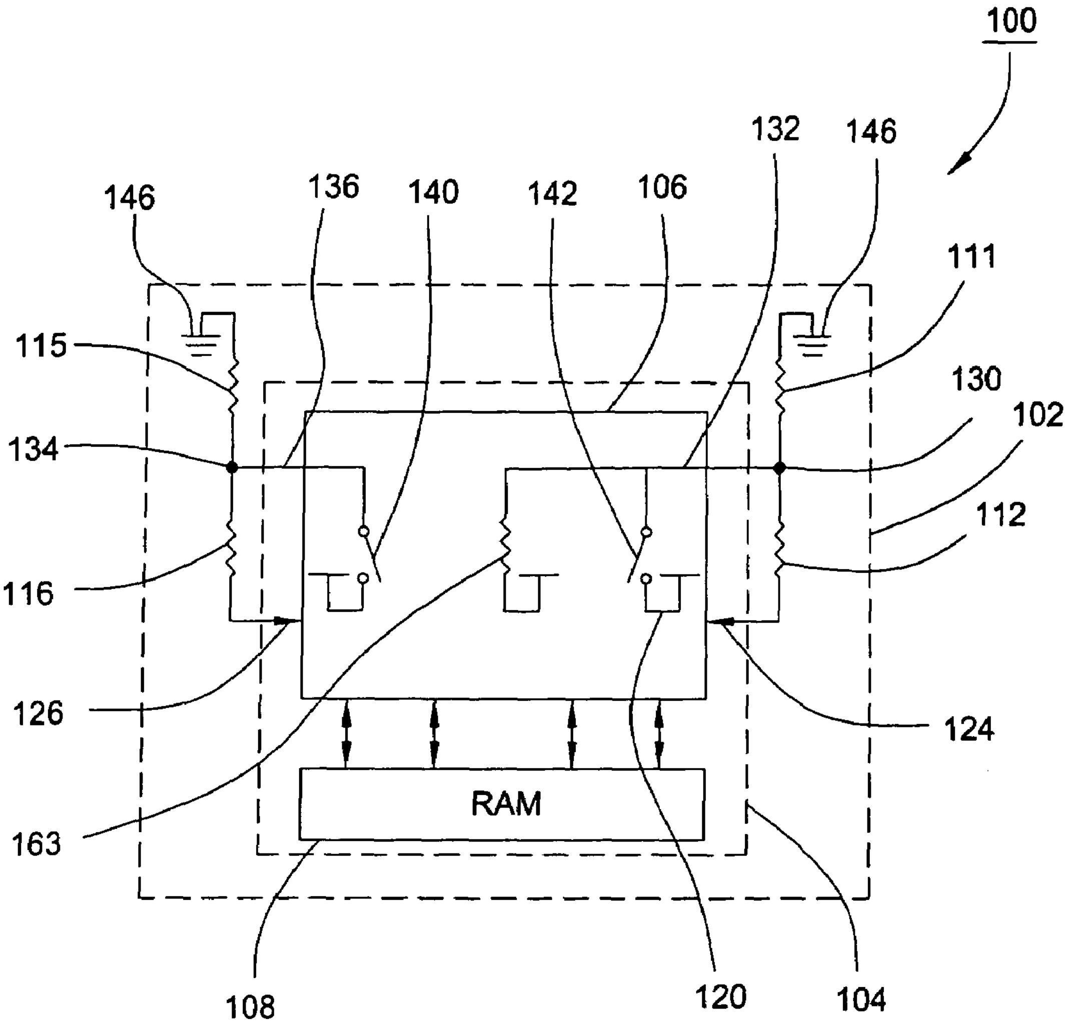

FIGS. 2A and 2B each illustrate a GPU interface system 100 that is in accord with the principles of the present invention. As shown in FIG. 2A, the system 100 includes a printed wiring board 102 on which a MAP 104 is mounted. The MAP 104 includes a GPU 106 and a RAM 108. The printed wiring board 102 also retains four resistors, the resistors 110, 112, 114, and 116. Resistors 110 and 114 connect at one end to a power supply connection 120. The resistor 112 extends from the other end of resistor 110 to a GPU bit input 124, while the resistor 116 extends from the other end of resistor 114 to a GPU bit input 126. The node 130 formed by resistors 110 and 112 connects to a strap contact 132, while the node 134 formed by resistors 114 and 116 connects to a strap contact 136. Within the MAP 104, but not necessarily in the GPU 106, is a contact 140 that connects to strap contact 136 and that spans a ground 146. A zero-ohm strap resistor may be installed to between contact 140 and ground 146, connecting strap contact 136 to ground 146 and causing the GPU bit input 126 to be at ground.

Still referring to FIG. 2A a zero-ohm strap resistor 162 connects contact 142 to ground. This causes the node 130 to be at ground, which also causes the GPU bit input 124 to be at ground. However, contact 140 is not connected to ground. Thus, node 134 and bit input 126 are at the power supply potential. By selectively installing strap resistors between contacts and ground, different bit patterns can be applied to the bit inputs. While FIG. 2A shows only two contacts (the contacts 140 and 142), in practice a MAP 100 could have many more contacts and bit inputs. Alternatively, contacts not connected to ground, such as contact 140 may be omitted.

In an alternative embodiment, shown in FIG. 2B, the system 100 includes a printed wiring board 102 on which a MAP 104 is mounted. The MAP 104 includes a GPU 106 and a RAM 108. The printed wiring board 102 also retains four resistors, the resistors 111, 112, 115, and 116. Resistors 111 and 115 connect at one end to ground 146. The resistor 112 extends from the other end of resistor 111 to a GPU bit input 124, while the resistor 116 extends from the other end of resistor 115 to a GPU bit input 126. The node 130 formed by resistors 111 and 112 connects to a strap contact 132, while the node 134 formed by resistors 115 and 116 connects to a strap contact 136. Within the MAP 104, but not necessarily in the GPU 106, is a contact 140 that connects to strap contact 136 and that spans power supply connection 120. A zero-ohm strap resistor may be installed to between contact 140 and power supply connection 120, connecting strap contact 136 to power supply connection 120 and causing the GPU bit input 126 to be at the power supply potential.

Still referring to FIG. 2B, a zero-ohm strap resistor 163 connects contact 142 to power supply connection 120. This causes the node 130 to be at the power supply potential, which also causes the GPU bit input 124 to be at the power supply potential. However, contact 140 is not connected to power supply connection 120. Thus, node 134 and bit input 126 are at ground. By selectively installing strap resistors between contacts and power supply potential, different bit patterns can be applied to the bit inputs. While FIG. 2B shows only two contacts (the contacts 140 and 142), in practice a MAP 100 could have many more contacts and bit inputs. Alternatively, contacts not connected to the power supply potential, such as contact 140 may be omitted.

The system 100 has the advantage of requiring only a single strap resistor for each bit of the memory type pattern. Furthermore, since the GPU interface system 100 is tolerant of the location of the strap resistor, that resistor can be located almost anywhere. If a particular bit of the bit pattern does not need to change across the various supported memory types, then the strap resistor for that bit can be replaced by a direct connection to ground or absence of a connection to ground. Likewise, a strap resistor may also be replaced by a direct connection to a power supply potential or absence of a connection to a power supply potential. Such features greatly reduce the MAP design challenge while allowing the manufacturer to use the same bill of materials regardless of the type of memory being used within the MAP.

Figure 3A:
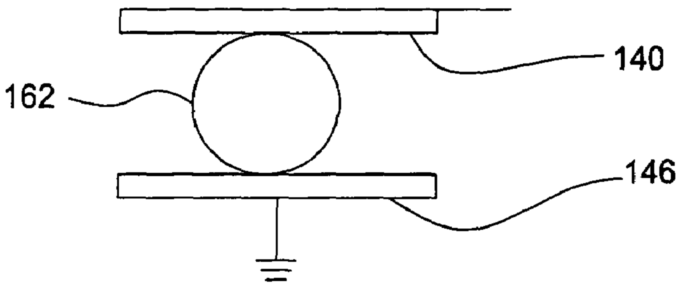
FIGS. 3A and 3B illustrate the use of a ball to close a switch.
Figure 3B:
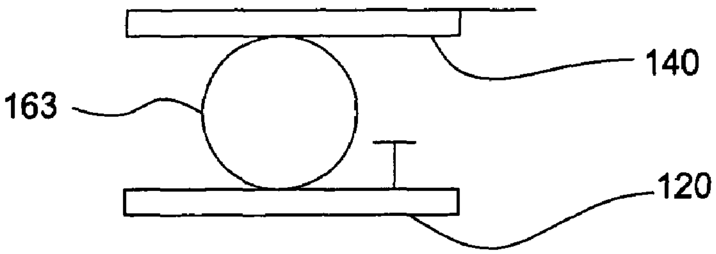

As previously noted, the MAP has limited space to locate the strap resistors 162 or 163. But, zero ohm strap resistors 162 or 163 can each take the form of balls that require little volume. For example, FIG. 3A illustrates a ball strap resistor 162 located between a contact 140 and ground 146. FIG. 3B illustrates a ball strap resistor 163 located between a contact 140 and power supply connection 120. In an alternate embodiment zero ohm strap resistors 162 or 163 can each take the form of a fuse-able interconnect in the device package. The fuse can be opened, e.g., blown, by using a laser or inducing a large current through the interconnect, optionally prior to populating a MAP with a GPU or memory devices.

Figure 4:
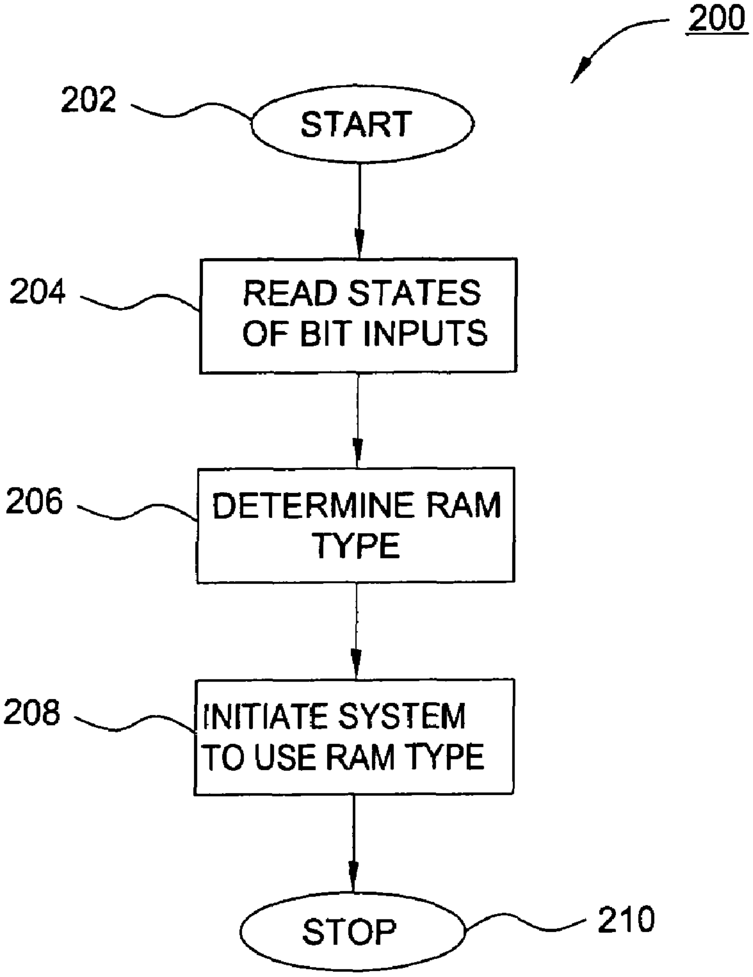
FIG. 4 shows a flow diagram of a computer system that is in accord with the principles of the present invention.

As noted, the bit pattern produced by the selectively populated strap resistors can be used to determine what type of memory is being used in the GPU interface system 100. That determination then can be used to properly initialize the GPU interface system 100. For example, FIG. 4 illustrates a procedure 200 that uses the bit pattern to initialize the system to work with a particular RAM. The software to operate the procedure 200 can be stored in firmware or received from a CPU. The procedure 200 begins at step 202. In practice, step 202 is performed after a reset occurs. At step 204 the states of the bit inputs are read. The procedure 200 then stores the bit input states. At step 206, based on the stored bit input state the procedure 200 determines the type of RAM 108 connected to the GPU 106 (see FIGS. 2A and 2B). Then, at step 208, based on the determined type of RAM 108, the GPU 106 initializes the system 100 to use the determined type of RAM. For example, the RAM speed, size, and operating voltage can be set up or programmed for operation. Then, at step 210 the procedure 200 stops.

Thus the principles of the present invention provide for automatic recognition of the type of memory within a device package via the presence or absence of one or more strap resistors within the device package itself.

Figure 5:
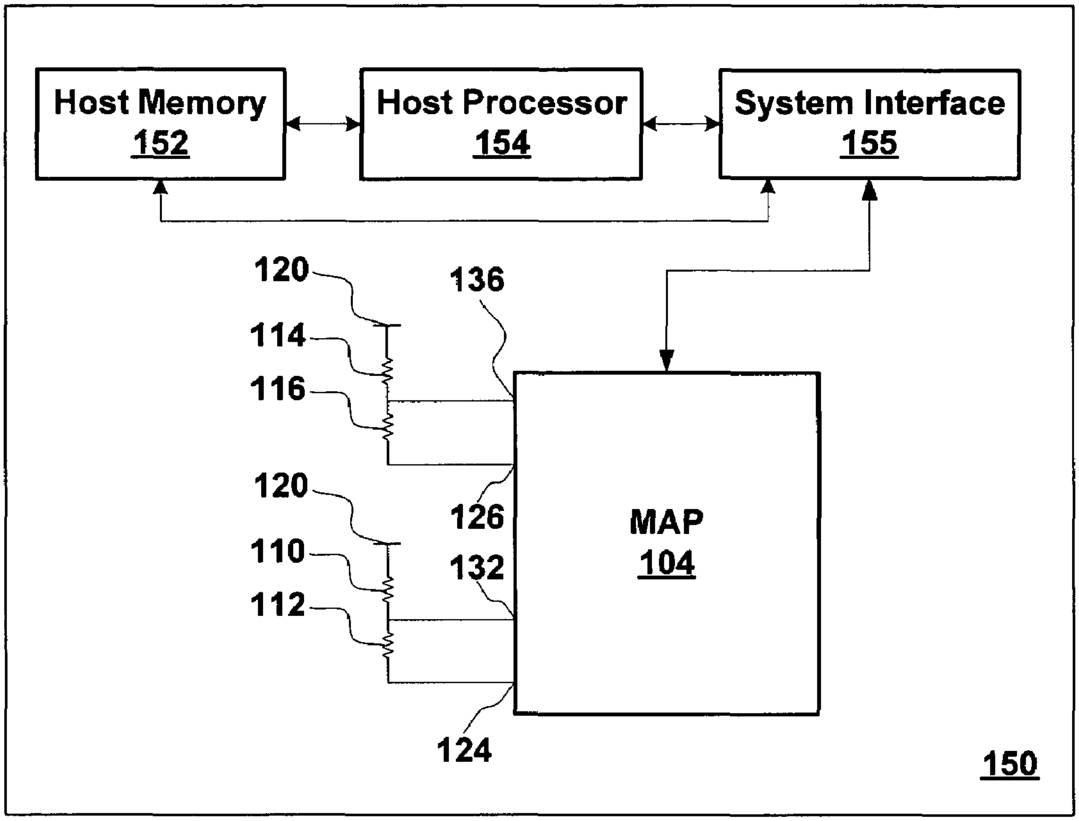
FIG. 5 shows a computing system that is in accord with the principles of the present invention.

FIG. 5 is an illustration of a computing system generally designated 150 and including a host processor 154, a host memory 152, a system interface 155, and the elements shown in FIG. 2A. Computing system 150 may be a desktop computer, server, laptop computer, palm-sized computer, tablet computer, game console, cellular telephone, computer based simulator, or the like. In one embodiment of computing system 150 host memory 152, host processor 154, system interface 155, MAP 104, and resistors 114, 116, 110, and 112 are coupled to a printed wiring board.

Host processor 154 may include a system memory controller to interface directly to host memory 152 or may communicate with host memory 152 through a system interface 155. System interface 155 may be an I/O (input/output) interface or a bridge device including the system memory controller to interface directly to host memory 152. Examples of system interface 155 known in the art include Intel® Northbridge and Intel® Southbridge. Host processor 154 communicates with MAP 104 via system interface 155.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. A computer system comprising:

a wiring board having a plurality of board contacts that are coupled to a voltage source; and a device package, including a memory device and a graphics processor, attached to said wiring board and, wherein said device package include a plurality of strap contacts, each electrically coupled to said board contact, and a plurality of bit inputs, each coupled to one of said strap contacts, establishing a bit pattern identifying the memory device, wherein the presence or absence of a single resistor on the wiring board connected to each of said strap contacts being read to define a bit pattern enabling recognition of the memory device.

2. The computer system of claim 1 wherein a first voltage is applied to each of said strap contacts when the resistor is present, and a second voltage is applied to each of said strap contacts when the resistor is absent to establish a binary bit pattern, and wherein the second voltage signals that a second type of memory is contained in the device package.

3. The computer system of claim 1 wherein the strap resistor is a low resistance element.

4. The computer system of claim 3 wherein the strap resistor is a conductive ball.

5. The computer system of claim 3 wherein the strap resistor is a fuse-able interconnect in the device package.

6. The computer system of claim 1 wherein the first voltage source is the system's power supply voltage.

7. The computer system of claim 6 wherein the second voltage source is the system's ground.

8. The computer system of claim 1 wherein the wiring board includes a first resistor coupled between a power supply and the strap contact.

9. The computer system of claim 1 wherein the wiring board includes a first resistor coupled between ground and the strap contact.

10. The computer system of claim 8 wherein the wiring board includes a second resistor coupled between the strap contact and the bit input.

11. The computer system of claim 9 wherein the wiring board includes a second resistor coupled between the strap contact and the bit input.

12. A method of operating a computer system including a device package containing a processor and a memory that is connected to the processor on a wiring board, wherein the device package includes strap resistors that identify the type of memory, the method comprising:

configuring the wiring board such that the strap resistors are selectively connected between strap contacts on the board and bit inputs on the device package to cause a bit pattern on the bit inputs, wherein the bit pattern depends on the selective connection of one or more the strap resistors, each between a voltage source and ground, to operate in pull-up or pull-down mode with each of the resistors defining a single bit in the bit pattern;

reading the bit pattern;

identifying the memory type from the bit pattern; and configuring the processor to work with the memory.

13. The method of claim 12 wherein a strap resistor is a low resistance element.

14. The method of claim 13 wherein the strap resistor is a conductive ball.

15. The method of claim 13 wherein the strap resistor is a fuse-able interconnect in the device package.

16. A computing system comprising:

a host processor, a host memory, the host memory storing programs for the host processor;

a system interface configured to interface with the host processor; and a device package including a memory device and a graphics processor, the device package configured to interface with the system interface including:

one or more strap resistors that identify characteristics of the memory device readable by the host processor, the presence or absence of a single resistor on the wiring board connected to each of said strap contacts being read to define a bit pattern enabling recognition of the memory device and an external circuit for determining whether the strap resistors function in a pull-up or pull-down mode.

17. The computing system of claim 16, wherein the characteristics include at least one of memory device speed, memory device operating voltage, and memory device capacity.

18. The computing system of claim 16, wherein the host memory is configured to interface with the system interface.

19. The computing system of claim 16, wherein the host memory is configured to directly interface with the host processor.

* * * * *